United States Patent [19]
Einsle et al.

[11] Patent Number: 6,032,449
[45] Date of Patent: Mar. 7, 2000

[54] PROCESS AND DEVICE FOR SPLICING AN OPTICAL CABLE TO THE CONDUCTOR STRAND OF AN AERIAL LINE

[75] Inventors: Günter Einsle, München; Dieter Kreutz, Grünwald; Ernst Mayr, Starnberg, all of Germany

[73] Assignee: Siemens Aktiengesellschaft, Munich, Germany

[21] Appl. No.: 09/171,088

[22] PCT Filed: Apr. 11, 1997

[86] PCT No.: PCT/DE97/00741

§ 371 Date: Oct. 13, 1998

§ 102(e) Date: Oct. 13, 1998

[87] PCT Pub. No.: WO97/39372

PCT Pub. Date: Oct. 23, 1997

[30] Foreign Application Priority Data

Apr. 15, 1996 [DE] Germany .......................... 196 14 839
Apr. 26, 1996 [DE] Germany .......................... 196 16 853

[51] Int. Cl.[7] .................................................. D02G 3/36
[52] U.S. Cl. .................................. 57/10; 57/18; 242/441.3
[58] Field of Search .................................. 57/3, 6, 10, 18, 57/19; 242/441.3, 441.4

[56] References Cited

U.S. PATENT DOCUMENTS

| 2,402,172 | 6/1946 | Macy ....................................... 175/376 |
| 2,592,943 | 4/1952 | Neale ........................................... 57/10 |
| 2,663,544 | 12/1953 | Harley ................................... 254/134.3 |
| 3,162,992 | 12/1964 | Davis et al. ................................. 57/10 |
| 4,274,574 | 6/1981 | Bishop .................................... 226/170 |
| 4,311,299 | 1/1982 | Elliott ................................... 254/134.3 |
| 4,424,954 | 1/1984 | Innes ............................................ 57/3 |

FOREIGN PATENT DOCUMENTS

| 32 28 227 | 2/1984 | Germany . |
| 32 28 239 | 2/1984 | Germany . |
| 37 02 781 | 8/1988 | Germany . |
| 19616853 | 6/1997 | Germany . |
| 2 173 471 | 10/1986 | United Kingdom . |
| WO 96/32661 | 10/1996 | WIPO . |
| WO 96/38892 | 12/1996 | WIPO . |

*Primary Examiner*—William Stryjewski
*Attorney, Agent, or Firm*—Hill & Simpson

[57] ABSTRACT

The lashing device has at least one supply reel, which contains a lashing element which is to be applied in a continuous spiral. The supply reel is mounted on a journal so that it can revolve about its longitudinal axis, and the journal, together with the supply reel, is arranged so that, with simultaneous longitudinal movement along the conductor, this journal wraps around the conductor in a rotating manner.

21 Claims, 4 Drawing Sheets

6,032,449

PROCESS AND DEVICE FOR SPLICING AN OPTICAL CABLE TO THE CONDUCTOR STRAND OF AN AERIAL LINE

BACKGROUND OF THE INVENTION

The device, which is known from DE 37 02 781 A1, for attaching an optical cable to the overhead ground cable of a high-voltage line comprises a stranding machine, which can be moved along the cable and carries with it a cable drum, and a lapping machine, which is coupled to the stranding machine and is equipped with a supply drum for a holding tape. Both machines have a drive which moves the respective drum over an orbit about the overhead ground cable. Since the cable drum is guided around the overhead ground cable with a changing direction of rotation, the optical cable is wrapped around it in the manner of an SZ stranding. The holding tape, which is applied in a long lay, serves to fix the lapping formed by the optical cable.

The device, which is known from DE 32 28 227 C2, attaches an optical cable with the aid of discrete lashing elements on a supporting conductor, but the retaining clamps, which serve as lashing elements, subject the cable to comparatively high mechanical loads. Moreover, there is a risk of the thermally expanded cable sagging between adjacent lashing elements, which may be disadvantageous in particular with regard to leakage currents occurring, but also with regard to the mechanical loading.

SUMMARY OF THE INVENTION

An object of the invention is to provide a simple way of attaching an optical cable to a conductor of an electrical overhead line in a reliable and rapid manner. This object is achieved by means of a device comprising a supply drum for an optical cable being mounted to rotate about a first axis; a supply reel for a first lashing element being mounted to rotate around a first longitudinal axis; first means for aligning the optical cable parallel to a longitudinal axis of a conductor to form a unit as the optical cable is hauled-off the supply drum; second means for displacing the supply drum and first supply reel in a direction of the first longitudinal axis of the conductor while maintaining the spaced orientation of the first axle; and third means for holding and rotating the first supply reel about a second axis which is oriented parallel to the longitudinal axis of the cable so that a first lashing element wraps around the unit in the form of a spiral.

The objects are also achieved by a method for attaching an optical cable to a conductor of an overhead line comprising the steps of providing a lashing device having a supply drum for the optical cable mounted for rotation on a first axle; displacing the lashing device and supply drum along the conductor of the overhead line; unwinding the cable from the supply drum while maintaining the orientation of the first axle and placing the cable adjacent the conductor to extend parallel thereto to form a unit; and wrapping a first lashing element around the unit in a spiral path by rotating a supply reel around a first axis as the element is withdrawn therefrom and rotating the reel around a second axis parallel to the longitudinal axis of the unit.

The supply reel, which is mounted so that it can revolve about its longitudinal axis, allows the haul-off rate to be increased and thus allows the cable installation time to be reduced. Moreover, the helical movement of the supply reel around the conductor allows the lashing element to be braided around the optical cable in a continuous coil or spiral.

Since the comparatively heavy cable drum does not have to move around the overhead ground cable, the mechanical structure of the device is considerably simplified. In addition, there is no need for any centripetal forces caused by the revolution of the cable drum to be compensated for by means of a corotating counterweight or to be picked up and taken off by bearings of correspondingly large dimensions. This allows the device to be of a more lightweight structure and to be moved over the conductor much more quickly than has hitherto been customary, so that the assembly time and assembly costs can be reduced.

DESCRIPTION OF THE PREFERRED EMBODIMENTS

Figure 1:
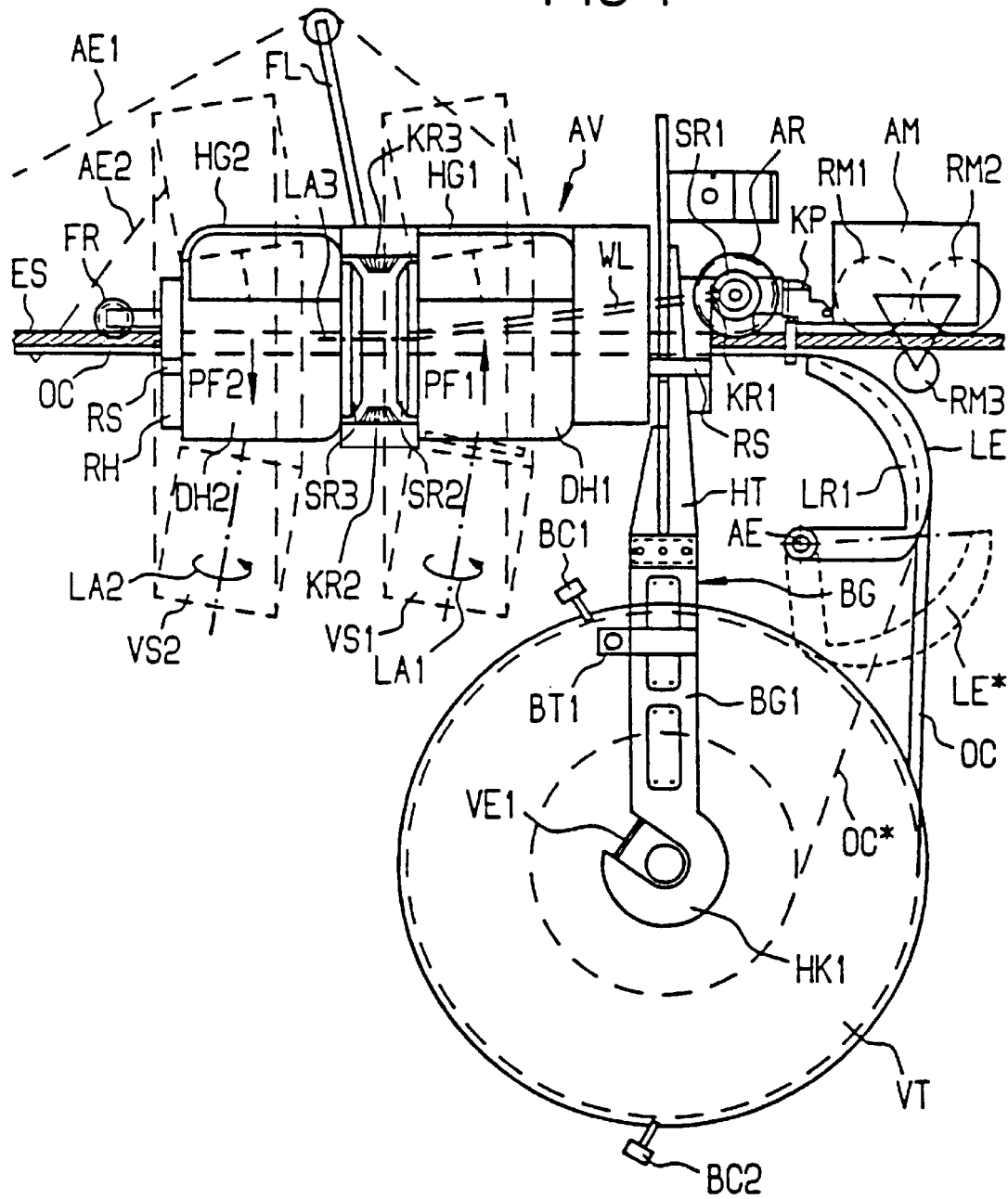
FIG. 1 is a side view of an exemplary embodiment of a lashing device in accordance with the invention.
Figure 2:
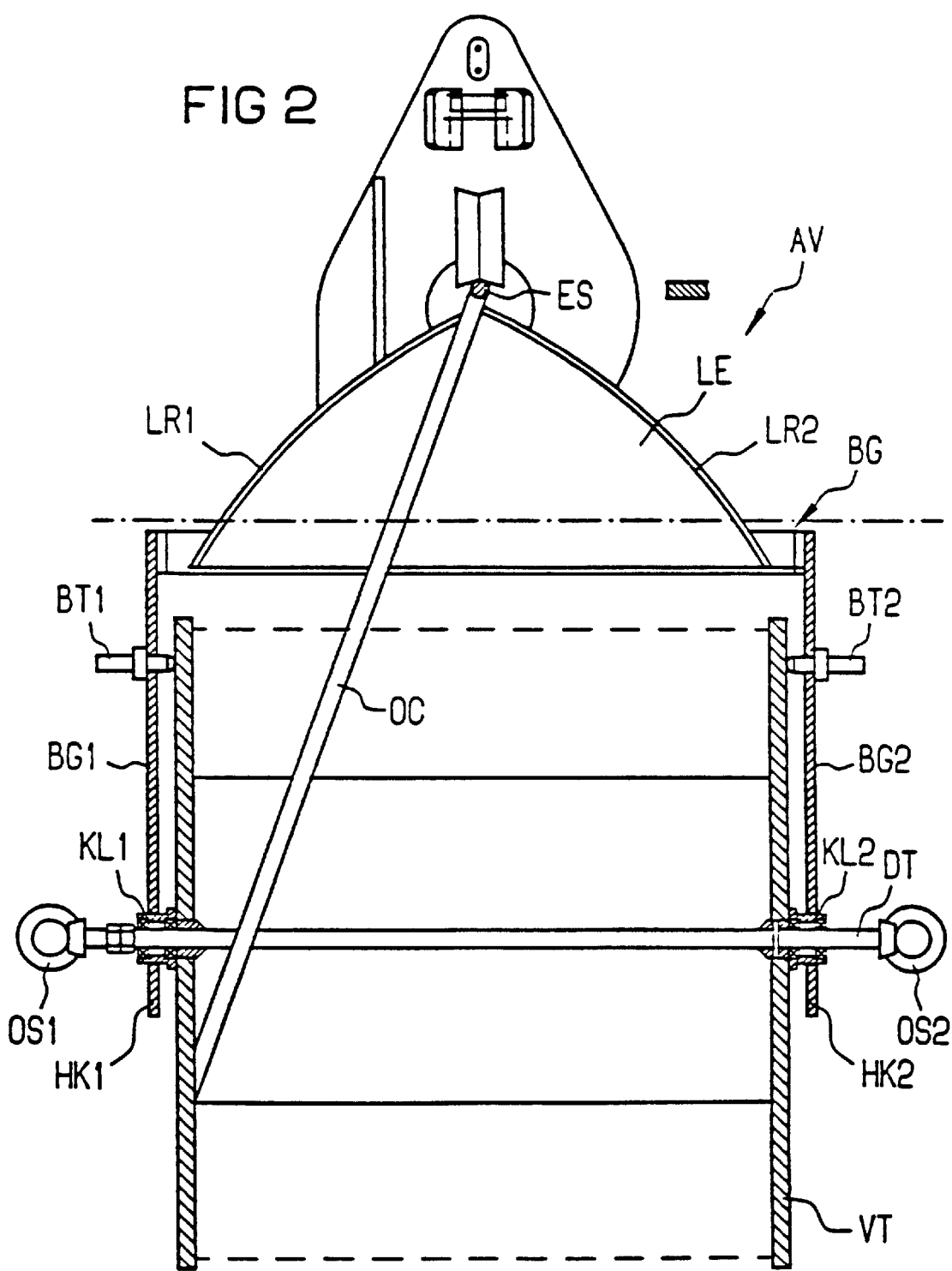
FIG. 2 is a partial end view of the lashing device in accordance with FIG. 1 as seen in the longitudinal direction of the conductor.

FIG. 1 shows a lashing device AV for attaching an optical cable OC to a stranded conductor ES of a high-voltage overhead line. The stranded conductor may be an overhead ground cable or a phase cable. The optical cable OC is arranged on a supply drum VT, which is mounted for rotation in a U-shaped bracket BG, which has bracket arms BG1 and BG2 (see FIG. 2). In detail, the supply drum VT is suspended, by means of a rotatable axle DT, in hooks HK1 and HK2, which are arranged at the end of the two bracket arms BG1 and BG2.

Expediently, the rotatable axle DT is mounted with respect to the bracket arms BG1 and BG2 by means of ball bearings KL1 and KL2, in order to keep the haul-off forces as low as possible. In order to suspend the rotatable axle DT in place, retention eyelets OS1 and OS2 are arranged at each of its outer ends. In order to prevent the cable drum VT from falling out, a lock is arranged at each of the openings of the hooks see lock VE1 (FIG. 1) HK1.

In order to prevent the optical cable OC from being unwound too quickly as a result of the supply drum VT continuing to revolve in the event of the lashing device AV being at a standstill or decelerating, suitable brake devices are to be provided. As can be seen also from FIG. 2, these devices may act on the outside of the supply drum VT (braking elements BT1 and BT2). In addition, or independently of this, it is also possible to provide a further braking device for the optical cable OC itself. This braking device acts directly on the respective cable and prevents an excessively large loop from being formed. In FIG. 1, two of these braking devices which act on the cable are present and are denoted by BC1 and BC2. They are advantageously designed as brush brakes and are arranged offset by 180°.

A guide device LE (e.g. designed as a guide plate) is provided for guiding and feeding the optical cable to the particular conductor ES, which guide device narrows in the direction of passage, is curved in the direction of passage of the cable OC and forms a trough-like a groove-like depression in which the cable OC is reliably guided. This guide device LE has a rim LR1 and LR2 (FIG. 2) which is drawn up laterally, which rim prevents the optical cable OC from springing out of the curved guide path. The guide device LE is advantageously held on a pin AE in such a way that it can be swung down, so that it can be swung down into a position LE* (cf. FIG. 1), if, for example, the lashing device is to be moved or guided around a pylon.

By means of the guide device LE, the optical cable OC is brought closer to the associated conductor ES or is pressed onto the latter, the optical cable OC and the conductor ES both running through the lashing device AV (FIG. 2) together. To this end, the lashing device AV has a tubular sleeve RH, which has a longitudinal slot RS (only part of which can be seen here), which runs in the direction of the axis of the conductor ES, i.e. running from left to right in the drawing. By means of this continuous longitudinal slot, the lashing device AV can be attached to the conductor ES from the side. The slot RS lies below the optical cable OC and hence also below the conductor ES, thus forming a protection against these elements springing out. The slotted sleeve RH is fixedly connected to the main supporting element HT, serving as a crossarm, which element provides the connection to the holding bracket BG for the cable supply drum VT. Thus the lashing device AV comprises, in a fixedly integrated manner, the cable drum VT and the actual lashing part with the tubular sleeve RH, the two parts being fixedly connected to one another via the crossarm HT.

The lashing device AV is guided on the conductor ES by means of at least two wheels, and one of these wheels, in the present case the front wheel AR, is designed as a driving wheel. This wheel AR is used to generate the requisite driving force for applying the lashing elements. This wheel AR is therefore in frictional engagement with the surface of the conductor ES, in which case the wheel may expediently be provided with a coating which increases the friction, for example of rubber or the like. The further or additional wheel or wheels (in this case only a single exit-side wheel FR is shown) are used to support the lashing device AV on the conductor ES. All the wheels used have on their circumference a groove profile, the size of which is matched to the diameters of the conductor ES.

A first bevel gear SR1 is connected to the driving wheel AR, which bevel gear transmits the revolving movement of this wheel to a second, smaller bevel gear KR1. This bevel gear KR1 is connected, preferably by means of a universal joint, to a shaft WL which runs inside the tubular sleeve RH and is connected at its other end, preferably also by means of a universal joint, to a flange which has a bevel gear SR2 on the outside.

In the following text, it is for the time being assumed that only one lashing element AE1 is to be used for lashing the optical cable AC to the conductor ES. For this purpose, a supply reel VS1, which is indicated in dashed lines, is provided, which supply reel is arranged in such a manner that it can revolve about its longitudinal axis LA1, as is explained in more detail with reference to FIG. 3. Moreover, it is intended that this supply reel VS1 should rotate about an axis LA3 which lies symmetrically, i.e. approximately in the center, between the conductor ES and the optical cable OC. For this purpose, a revolving sleeve DH1, which serves as a support for the supply reel VS1, is mounted for rotation on the slotted tubular sleeve RH. Thus, by rotating the revolving sleeve DH1, the supply reel VS1 can be made to rotate about the axis LA3, because the flange which has the bevel gear SR2 is fixedly connected to the revolving sleeve DH1. Thus, the force is transmitted via one or more transmission elements which are preferable, bevel gears. The outline of the rotational movement of the supply reel VS1 in the event of rotation of the revolving sleeve DH1 is also illustrated in dashed lines. The revolving sleeve DH1 has a grip HG1, by means of which it can be attached to the outside of the slotted tubular sleeve RH after the latter has been attached to the conductor ES. The revolving sleeve also has a longitudinal slot which is not shown here and which extends in the direction of axis LA3.

Owing to the revolution about the axis LA1, the lashing element AE1 is pulled off the supply reel VS1 and passes outward over corresponding guide devices, e.g. a flyer FL which also rotates with the reel VS1 and, from here, runs at an angle onto the combination of conductor ES and optical cable OC so that the lashing element AE1 is wound continuously onto this combination.

In many cases, it is desirable to apply two lashing elements AE1 and AE2, in which case the application preferably takes place with reversed lays (in the form of a crossed spiral). For this purpose, in the present example a bevel gear SR3 is provided, in which a pair of bevel gears KR2 and KR3, which can revolve only about their longitudinal axis but are otherwise fixed, engages. By means of these bevel gears KR2 and KR3, the revolving movement provided by the driving wheel AR is transmitted to the bevel gear SR3, which is flanged onto a revolving sleeve DH2, this revolving sleeve likewise being able to rotate about the slotted tubular sleeve RH. Analogously to the supply reel VS1, a supply reel VS2 which can revolve about its longitudinal axis is provided on the revolving sleeve DH2, sleeve with the supply reel VS2 rotates in the opposite direction of the arrow PF2 to the direction of arrow PF1 for the revolving sleeve DH1 manner to apply a crosslay with the two lashing elements AE1 and AE2.

Advantageously, the axes of rotation LA1 and LA2 of the supply reels VS1 and VS2 include an acute angle with the longitudinal axis LA3 of the cable-conductor combination, and specifically they are inclined toward the haul-off direction, i.e. to the left in the present example. The angular deviation from 90° preferably approximately corresponds to the wrap-around angle of the lashing elements on the conductor ES, i.e. it advantageously lies between approximately 10° and 20°, preferably around 15°. As a result, the haul-off operation itself can be facilitated. If two supply reels VS1 and VS2 which rotate in opposite directions are provided, in most cases it is possible to do without corresponding balancing weights if it is ensured that the two supply reels are in each case positioned offset through 180°. If only one supply reel VS1 is used, it is expedient to allow a corresponding counterweight to rotate with it in order to balance out the forces.

Figure 3:
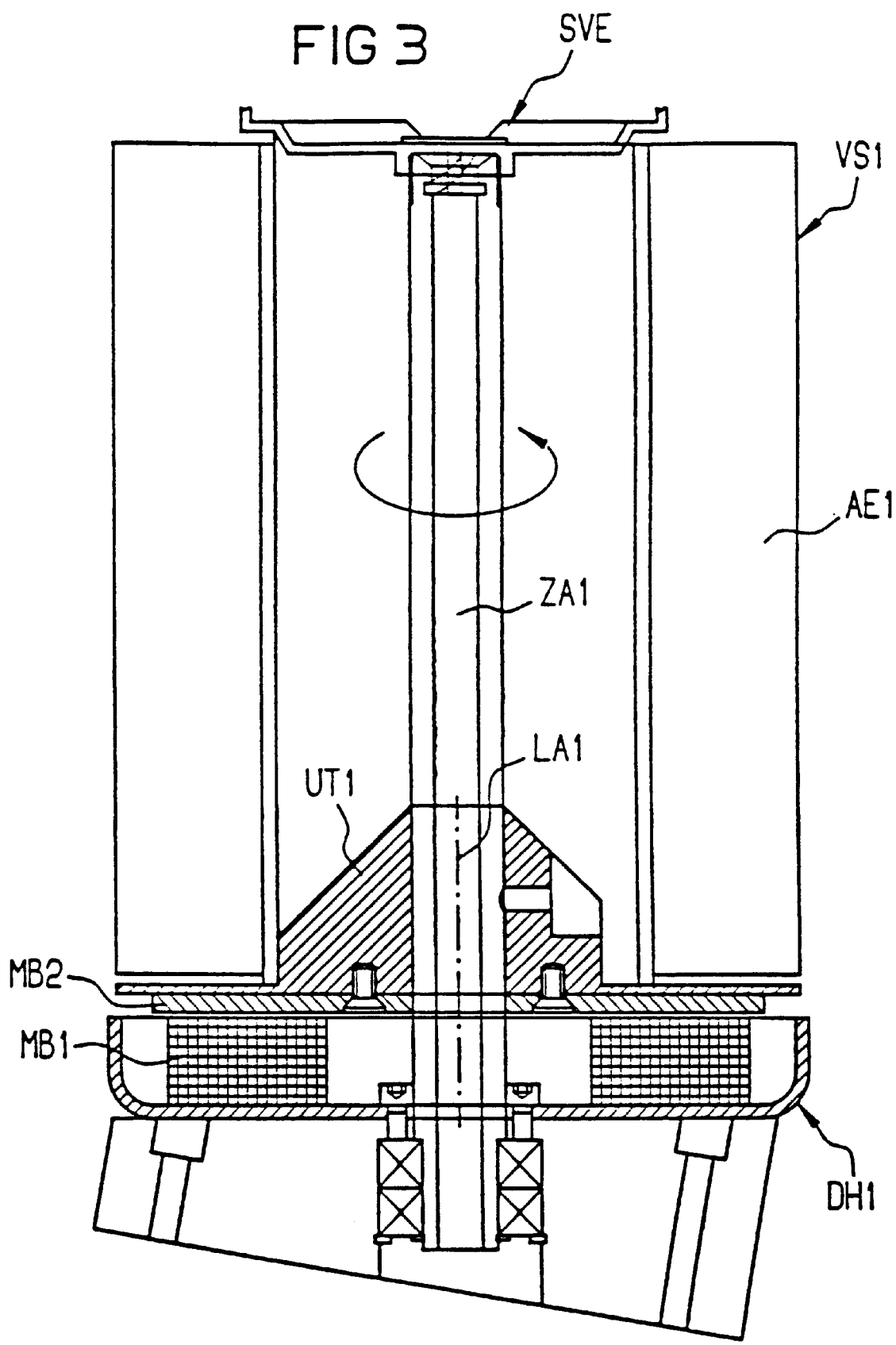
FIG. 3 is an enlarged view of the mounting of a supply reel on a journal.

FIG. 3 shows part of the annular outer delimitation of the revolving sleeve DH1, in section. A journal or shaft ZA1 is fixedly attached to said sleeve, to which journal, in turn, the supply reel VS1 with the lashing element AE1 (which in this figure is shown only in the form of a block) is attached by means of a quick-acting closure element SVE, thus forming a center sleeve. The quick-acting closure SVE is selected in such a way that the supply reel can rotate with respect to the fixed journal ZA1, i.e. it expediently contains a ball bearing or roller bearing. The supply reel VS1 is placed on a bottom part UT1 and held fixedly thereon, which bottom part is mounted, by means of ball bearings or the like (not shown in more detail here), in such a manner that it can revolve with respect to the journal ZA1. A hysteresis disk or magnetic disk MB2 is attached to the bottom part UT1, which disk rotates, together with the supply reel VS1, about the axis LA1. A permanent magnet MB1, preferably a ring magnet, is arranged in the region of the revolving sleeve DH1, separated from the disk MB2 by a gap, the rotating movement of the supply reel or the magnetic disk MB2 with respect to the magnet MB1 generating a braking force which prevents the lashing element AE1 from running off too quickly and hence forming undesirable loops. Naturally, as an alternative to the magnetic brakes it is also possible to use all other known braking devices, such as for example brush brakes, drum brakes or the like, in order to haul the lashing element AE1 off the supply reel VS1 under tensile stress and thus to exert a corresponding tensile stress on the conductor-cable combination ES/OC.

Advantageously, tape-like structures are used as the lashing elements, e.g. AE1, with the result that the thickness and pressure can be kept relatively low even under high and fixed tensile stresses on the lashing element at the optical cable OC. Preferably, self-adhesive lashing elements are used, because these hold the conductor-cable combination ES/OC particularly successfully and securely. These lashing elements may also, in addition, be provided with a reinforcement fabric or an additional reinforcement layer in the form of filaments or rovings and the like, which correspondingly increases their tensile force and their robustness.

The longitudinal movement of the lashing device AV can be ensured by means of a drive unit AM which is structurally connected thereto and contains, for example, an internal combustion engine or a motor which is powered electrically via suitable power supply lines. This drive unit AM runs along the conductor ES by means of running wheels RM1 and RM2 and a corresponding counterpressure wheel RM3 and is connected in an articulated manner to the actual lashing device AV by way of a coupling KP. As an alternative to a coupling KP, it is also possible to use a rope or rod or the like.

It is also possible to drive the lashing device AV by means of a drawing-in wire which is wound, for example, onto a drum which is attached to a pylon or to the ground, as a result of which the lashing device AV moves along the conductor ES.

In a modification of the invention or also independently thereof, it is possible to proceed in such a way that the fiber-optic cable which is to be installed is continuously attached along a conductor of the high-voltage overhead line in an arrangement which is combined to form a cable train, using a continuous attachment means in the form of a wound strip. The cable train comprises a traveling trolley, a cable trailer and a lashing machine, which are fixedly coupled to one another and form a single unit. The cable train as a whole is pulled along a suspension span by the traveling trolley, the fiber-optic cable which is situated in a cable drum in the cable trailer being unwound and, with the aid of the lashing machine of the cable train, being attached preferably to the overhead ground cable of the high-voltage overhead line. In this case, attachment takes place using a continuous wound tape which is wound around the conductor and the fiber-optic cable in the form of a spiral. This wound tape comprises, by way of example, a glass or plastic tape which is wound in a simple, continuous manner. However, depending on the design of the lashing machine, it is also possible to coil two tapes in a crosslay around the conductor and the fiber-optic cable, if a higher level of reliability is required. The fiber-optic cable which is to be installed can be lashed either to the overhead ground cable or to a phase cable of the high-voltage overhead line.

The cable train can be moved along within a suspension span using a drive unit in the traveling trolley, in which case a remote control is advantageously used for this purpose. However, the cable train can also be moved along with the aid of a dielectric drawing-in wire which is attached to the traveling trolley and at the end of the suspension span is guided over diverting rollers to a wire winch.

The fiber-optic cable which is to be installed and is wound on the cable drum of the cable trailer is generally very lightweight (approx. 20 g/m) and runs off the cable drum under slight braking, which drum is installed in a frame provided with running rollers, in the form of the cable trailer. The three functional components of the traveling trolley, cable trailer and lashing machine are coupled to one another and are thus guided jointly along a suspension span.

In the event of faults occurring, such as for example in the event of failure of the remote control, it is provided, in the event of such a fault, for the cable train to be coupled to an additional traveling trolley from the end of the suspension span and to be pulled to the end of the suspension span. This ensures that faults in the drive system of the cable train can be overcome in a relatively simple manner.

Figure 4:
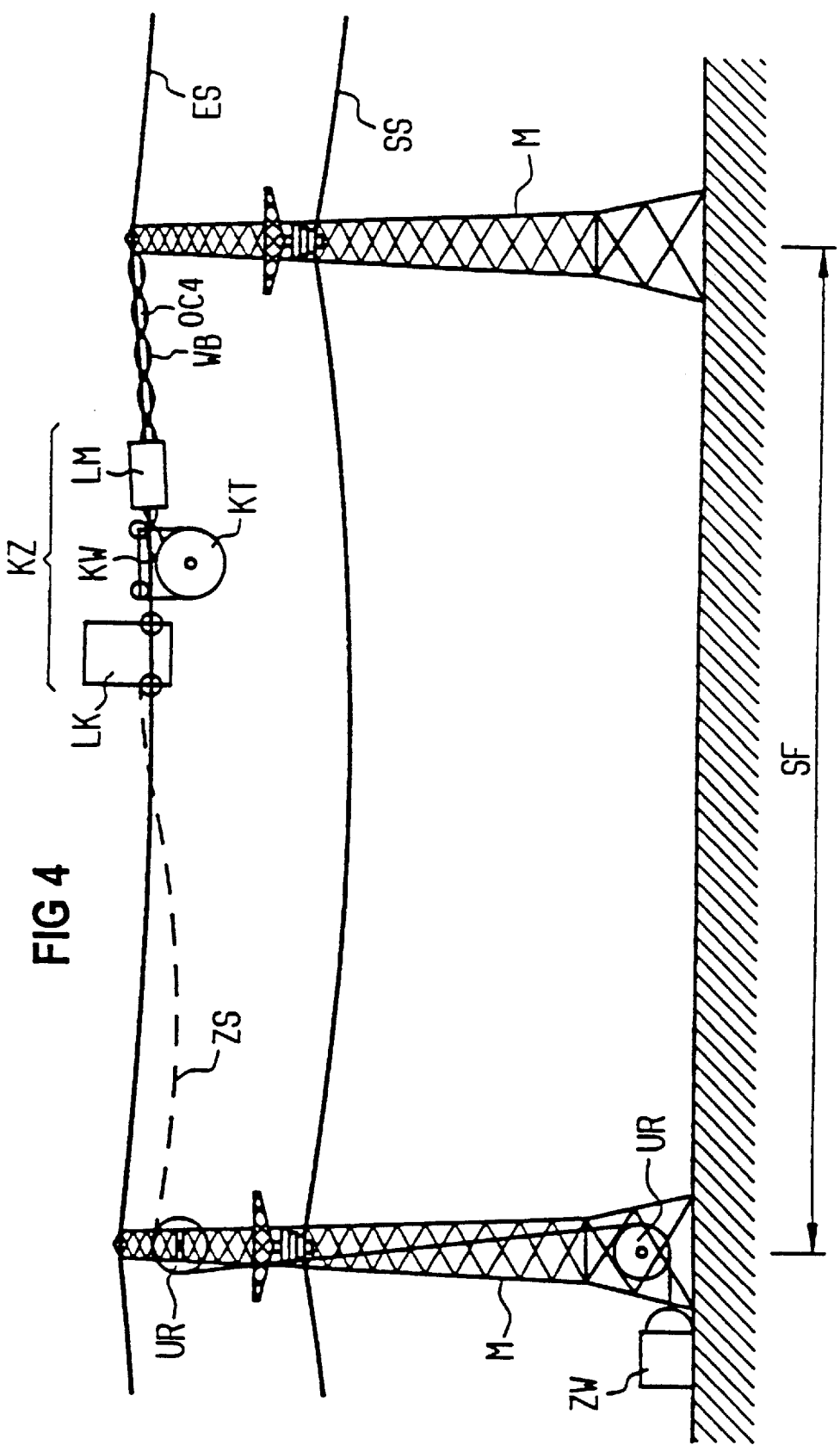
FIG. 4 is a diagrammatic view of a modification of the lashing method according to the invention.

The above-described embodiment of a cable train is explained in more detail with reference to FIG. 4. This figure shows a suspension span SF between two pylons M of a high-voltage overhead line, with the phase cables or voltage cables SS and an overhead ground cable ES. In this case, a fiber-optic cable is being installed on the overhead ground cable ES of the high-voltage overhead line, using a cable train KZ. This cable train KZ comprises individual functional components which are fixedly coupled to one another, namely a traveling trolley LK, a cable trailer KW with a cable drum KT, and a lashing machine LM. Using the lashing machine LM, a wound tape (lashing tape) WB is wound around the fiber-optic cable OC4, which is being installed on the conductor ES and the overhead ground conductor ES in the form of a spiral, this figure, by way of example, showing the winding in a crosslay with two wound tapes. In more simple cases, winding can also take place with only one wound tape. The cable trailer KW comprises a cable drum KT, on which the fiber-optic cable OC4 to be installed is wound. At the head of the cable train KZ there is situated the traveling trolley LK, which is pulled along the suspension span SF either with the aid of a dielectric drawing-in wire ZS or by means of its own drive unit. In the case where a drawing-in wire ZS is used, the latter is coupled to the traveling trolley from the end of the suspension span and is guided downward to an additional wire winch ZW via diverting rollers UR on the pylon M. If a dedicated drive unit is used, it is expedient for it to be controlled with the aid of a remote control device, so that there is no need to install additional lines or cables.

What is claimed is:

1. A device for attaching an optical cable to a conductor of an electrical overhead line using a first lashing element, said device comprising a supply drum for the optical cable being mounted to rotate about a first axle of the device; a supply reel for the first lashing element being mounted to rotate about a first longitudinal axis; first means for aligning the optical cable as it is hauled-off of the supply drum parallel to the longitudinal axis of the conductor; second means for displacing the device with the supply drum and the first supply reel in a direction of the longitudinal axis of the conductor while maintaining the spatial orientation of the first axle; and third means for holding and rotating the supply reel about a second axis which is oriented parallel to a longitudinal axis of the cable so that the first supply reel moves about the longitudinal axis of the cable to wrap the first lashing element around a unit comprising the conductor and the optical cable to form a continuous spiral.

2. A device according to claim 1, which includes a guide device which deflects the first lashing element toward a unit formed by the conductor and optical cable, said guide device being mounted to rotate with the first supply reel about the second axis.

3. A device according to claim 1, which includes a second supply reel carrying a second lashing element, said second supply reel being mounted to rotate around a second longitudinal axis and fourth means for rotating the second supply reel about the second axis.

4. A device according to claim 3, wherein the fourth means rotates the second supply reel about the second axis in a direction opposite to the rotation of the first supply reel.

5. A device according to claim 3, wherein the third means has a tubular sleeve which is slotted in the direction of the longitudinal axis of the conductor, a first revolving sleeve which supports the first supply reel being mounted on the tubular sleeve so that it can revolve about the second axis, and the fourth means has a second revolving sleeve which supports the second supply reel being mounted on the tubular sleeve so that it can revolve about the second axis.

6. A device according to claim 5, wherein the first and second revolving sleeves are each provided with a bevel gear, which bevel gears are interconnected by a transmission element.

7. A device according to claim 6, which includes a drive wheel which is supported on the conductor and is connected to an additional bevel gear, a shaft transmitting the revolutions of the driving wheel and additional bevel gear to the bevel gear assigned to the first revolving sleeve.

8. A device according to claim 5, which includes a permanent magnet and, opposed to the permanent magnet at a distance therefrom, a magnetic disc being provided in one of the revolving sleeves, the magnetic disc rotating together with the corresponding supply reel, which is arranged on a shaft about the longitudinal axis of the supply reel.

9. A device according to claim 1, wherein the longitudinal axis of the conductor and the first longitudinal axis of the first supply reel include an angle which lies in a range between 70° and 80° and facilitates hauling-off of the first lashing element.

10. A device according to claim 1, wherein the first means has a guide device which narrows in the direction of passage of the optical cable to provide a trough-like depression and guides the optical cable toward the longitudinal axis of the conductor so that it approaches the conductor.

11. A device according to claim 1, which includes at least one braking device which acts on one of the optical cable, a supply reel and the supply drum.

12. A device according to claim 11, which includes a draw-in wire which moves the device along the conductor and is connected to a wire winch.

13. A device according to claim 1, wherein the device includes a holder with two bracket arms for suspending the first axle with the supply drum beneath the conductor.

14. A device according to claim 1, which includes a drive unit which is supported on the conductor and is connected to the device.

15. A device according to claim 14, wherein the drive unit is arranged as a traveling trolley which is coupled to the device.

16. A device according to claim 15, wherein the supply drum is arranged in a cable trailer which is provided with running rollers and the cable trailer is coupled to the device and to the traveling trolley.

17. A device according to claim 1, wherein the lashing element is a tape.

18. A method for attaching an optical cable to a conductor of an electrical overhead line, said method comprising providing a lashing device having a supply drum for an optical cable mounted for rotation on a first axle; displacing the lashing device and supply drum along the conductor of the electrical overhead line; unwinding the cable from the supply drum while maintaining an orientation of the first axle and placing the cable adjacent the conductor to extend parallel thereto to form a unit and wrapping a first lashing element around the unit in a spiral path by rotating a supply reel around a first axis as the element is withdrawn therefrom and rotating the reel around a second axis extending parallel to the longitudinal axis of the unit.

19. A method according to claim 18, which includes wrapping a second lashing element around the unit in a spiral path by rotating a second supply reel about a second longitudinal axis and, as the element is withdrawn therefrom, rotating the second supply reel around a second axis in an opposite direction to the rotation of the first supply reel so that the spiral path of the second lashing element is opposite to the spiral path of the first lashing element.

20. A method according to claim 18, wherein said providing the lashing device provides a cable trailer which holds the supply drum which are suspended on the conductor and coupled to a traveling trolley which is likewise suspended on the conductor to displace the lashing device and supply drum along the conductor.

21. A method according to claim 20, which includes pulling the traveling trolley across a suspension span using a dielectric draw-in wire which is attached to the traveling trolley and a wire winch.

* * * * *